United States Patent [19]
Copeland et al.

[11] Patent Number: 5,867,708
[45] Date of Patent: Feb. 2, 1999

[54] SYSTEM, METHOD, AND ARTICLE OF MANUFACTURE FOR ADDING CONCURRENCY TO A BINARY CLASS IN AN OBJECT ORIENTED SYSTEM

[75] Inventors: George Prentice Copeland, Austin, Tex.; Simon Antony James Holdsworth, Andover, England; Stanley Alan Smith, Austin, Tex.

[73] Assignee: International Business Machines Corporation, Armonk, N.Y.

[21] Appl. No.: 560,877

[22] Filed: Nov. 20, 1995

[51] Int. Cl.$^6$ .................................................. G06F 9/44
[52] U.S. Cl. ..................... 395/701; 345/705; 345/614
[58] Field of Search ............................... 395/701, 705, 395/683, 680, 614

[56] References Cited

U.S. PATENT DOCUMENTS

| | | | |
|---|---|---|---|
| 4,525,780 | 6/1985 | Bratt et al. | 364/200 |
| 4,814,971 | 3/1989 | Thatte | 364/200 |
| 4,853,842 | 8/1989 | Thatte et al. | 364/200 |
| 4,989,132 | 1/1991 | Mellender et al. | 364/200 |
| 5,008,786 | 4/1991 | Thatte | 364/200 |
| 5,016,162 | 5/1991 | Epstein et al. | 364/200 |
| 5,043,871 | 8/1991 | Nishigaki et al. | 364/200 |
| 5,047,925 | 9/1991 | Kun et al. | 364/200 |
| 5,075,845 | 12/1991 | Lai et al. | 395/425 |
| 5,093,914 | 3/1992 | Coplien et al. | 395/704 |
| 5,095,480 | 3/1992 | Fenner | 370/94.1 |
| 5,111,413 | 5/1992 | Lazansky et al. | 364/578 |
| 5,136,712 | 8/1992 | Perazzoli, Jr. et al. | 395/700 |
| 5,142,674 | 8/1992 | Barker et al. | 395/600 |
| 5,163,148 | 11/1992 | Walls | 395/600 |
| 5,185,885 | 2/1993 | Dysart et al. | 395/600 |
| 5,261,052 | 11/1993 | Shimamoto et al. | 395/200 |
| 5,265,221 | 11/1993 | Miller | 395/725 |
| 5,276,872 | 1/1994 | Lomet et al. | 395/600 |
| 5,280,610 | 1/1994 | Travis, Jr. et al. | 395/600 |
| 5,283,830 | 2/1994 | Hinsley et al. | 380/25 |
| 5,287,453 | 2/1994 | Roberts | 395/200 |
| 5,291,283 | 3/1994 | Kondo et al. | 348/390 |
| 5,295,256 | 3/1994 | Bapat | 395/500 |
| 5,297,279 | 3/1994 | Bannon et al. | 395/600 |
| 5,297,283 | 3/1994 | Kelly, Jr. et al. | 395/650 |
| 5,301,286 | 4/1994 | Rajani | 395/400 |
| 5,301,316 | 4/1994 | Hamilton et al. | 395/600 |
| 5,303,375 | 4/1994 | Collins et al. | 395/650 |
| 5,321,841 | 6/1994 | East et al. | 395/725 |
| 5,325,524 | 6/1994 | Black et al. | 395/600 |
| 5,335,323 | 8/1994 | Kolnick | 395/164 |
| 5,341,478 | 8/1994 | Travis, Jr. et al. | 395/200 |
| 5,343,554 | 8/1994 | Koza et al. | 395/13 |
| 5,363,313 | 11/1994 | Lee | 364/491 |

(List continued on next page.)

*Primary Examiner*—Kevin A. Kriess
*Attorney, Agent, or Firm*—Mark S. Walker; George E. Clark

[57] ABSTRACT

A system, method and article of manufacture for automatically inserting concurrency object services into binary classes in an information handling system employing object oriented technology, includes the steps of recognizing a constraint indicating that an object does not support concurrency and generating a concurrent version of the object. One alternative for generating a version of an object supporting concurrency is automatic transactional locking. The approach includes the steps of inheriting from the Lockable class which adds state to a class to allow object-level locking, inheriting from the Serialised metaclass which adds before and after methods to all methods of the non-concurrent version, and the object must be a Recoverable-Object. Another alternative for generating a version of an object supporting concurrency is automatic per method locking. The approach includes the steps of inheriting from the Lockable class which adds state to a class, and inheriting from the Serialised metaclass which adds before and after methods to all methods of the non-concurrent version. Another alternative for generating a version of an object supporting concurrency is explicit locking. The approach for RecoverableObjects includes the step of inheriting from a ConcurrentObject (which is derived from the Lockable class). The approach for non-RecoverableObjects also includes the step of inheriting from a ConcurrentObject.

15 Claims, 4 Drawing Sheets

U.S. PATENT DOCUMENTS

| | | | |
|---|---|---|---|
| 5,369,702 | 11/1994 | Shanton | 380/4 |
| 5,369,778 | 11/1994 | San Soucic et al. | 395/800 |
| 5,371,891 | 12/1994 | Gray et al. | 395/705 |
| 5,379,432 | 1/1995 | Orton et al. | 395/683 |
| 5,404,506 | 4/1995 | Fujisawa et al. | 395/600 |
| 5,404,508 | 4/1995 | Konrad et al. | 395/600 |
| 5,404,529 | 4/1995 | Chernikoff et al. | 395/683 |
| 5,408,649 | 4/1995 | Beshears et al. | 395/575 |
| 5,412,774 | 5/1995 | Agrawal et al. | 395/157 |
| 5,414,840 | 5/1995 | Rengarajan et al. | 395/600 |
| 5,421,012 | 5/1995 | Khoyi et al. | 395/650 |
| 5,421,015 | 5/1995 | Khoyi et al. | 395/650 |
| 5,437,027 | 7/1995 | Bannon et al. | 395/600 |
| 5,475,845 | 12/1995 | Orton et al. | 395/682 |
| 5,519,867 | 5/1996 | Moeller et al. | 395/677 |
| 5,617,569 | 4/1997 | Gray et al. | 395/705 |
| 5,632,034 | 5/1997 | O'Farrell | 395/701 |

SYSTEM, METHOD, AND ARTICLE OF MANUFACTURE FOR ADDING CONCURRENCY TO A BINARY CLASS IN AN OBJECT ORIENTED SYSTEM

TECHNICAL FIELD OF THE INVENTION

The present invention relates to information handling systems, methods and articles of manufacture, and more particularly to information handling systems and methods for facilitating code reuse in an object oriented system.

BACKGROUND OF THE INVENTION

There is a need to automatically add various forms of isolation among concurrent users to a binary class. Sometimes the source code is not available to modify the class. Even when source code is available, a great deal of reprogramming is required to add these features.

The user should be able to add these features in a way that does not increase the size of the user's class diagram with many variations on the original class.

The user should be able to specify these features as constraints along with constraints that describe the function of the class (e.g., a speaker driver that can go to less than 10 CPS and costs less than $5) when searching for the class. These features should include whether the object is persistent, whether its persistence can be controlled by the object's clients, how it is faulted into memory, and how it is synced with its datastore.

PRIOR ART

In the prior art there are many techniques for improving object oriented programming systems (OOPS).

The following are examples of the prior art.

U.S. Pat. Nos. 5,379,432, and 5,404,529 teach a system for enabling an object oriented application to access a procedural operating system having a native procedural interface.

Although the patents generally deal with apparatus and methods for controlling execution of object oriented programs, the patents do not teach nor suggest automatically inserting object services into binary classes in an object oriented system as is taught and claimed herein with reference with the present invention.

U.S. Pat. No. 5,093,914 generally teaches a method used by a digital computer in controlling execution of an object oriented program to effect a defined action, for example, stopping the program when a specified virtual function is invoked on a specified object during execution of the program.

Although the patent generally deals with methods for controlling execution of object oriented programs, the patent does not teach nor suggest automatically inserting object services into binary classes in an object oriented system as is taught and claimed herein with reference with the present invention.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patent deals generally with the use of object oriented systems including classes and sub-classes for solving problems, the patent does not teach nor suggest automatically inserting various forms of isolation among concurrent users into binary classes in an object oriented system as is taught and claimed herein with reference with the present invention.

There is a need to automatically add object services features, for example, persistence, recoverability, concurrency and security to a binary class. A related copending patent application Ser. No. 08/537,648 filed Oct. 8, 1995 teaches and claims automatically inserting object services into binary classes in an object oriented system. Sometimes the source code of a class is not available for modification. Even when the source code is available, a considerable reprogramming effort is required to add the object services features.

A user should be able to add object services features such as concurrency in a way that does not increase the size of the users class diagram with many variations on the original class. The user should be able to specify these object services features as constraints along with constraints that describe the function of the class when searching for the class.

An overall goal in object oriented programming systems is the development of program objects which can be reused easily. The importance of binary code over source code increases with the degree of reuse. For object oriented technology to achieve large scale success, binary code reuse is essential. As the state of the art moves towards applications built from object formats which can be tailored and plugged into each other, binary code is critical.

The Object Management Group is defining a set of interfaces for object system services named Common Object Services.

SUMMARY OF THE INVENTION

It is an object of the present invention to automatically insert concurrency object services into binary object classes.

Accordingly, a method for automatically inserting concurrency object services into binary classes in an information handling system employing object oriented technology, includes the steps of recognizing a constraint indicating that an object does not support concurrency and generating a concurrent version of the object.

One alternative for generating a version of an object supporting concurrency is automatic transactional locking. The approach includes the steps of inheriting from the Lockable class which adds state to a class to allow object-level locking, inheriting from the Serialised metaclass which adds before and after methods to all methods of the non-concurrent version, and the object must be a Recoverable-Object.

Another alternative for generating a version of an object supporting concurrency is automatic per method locking. The approach includes the steps of inheriting from the Lockable class which adds state to a class, and inheriting from the Serialised metaclass which adds before and after methods to all methods of the non-concurrent version.

Another alternative for generating a version of an object supporting concurrency is explicit locking. The approach for RecoverableObjects includes the step of inheriting from a ConcurrentObject (which is derived from the Lockable class). The approach for non-RecoverableObjects also includes the step of inheriting from a ConcurrentObject.

It is an advantage of the present invention that no reprogramming effort is required for insertion of concurrency object service, source code is not required and, in fact, is not desired, and the user's class diagram and library do not increase in complexity or size.

DETAILED DESCRIPTION OF A PREFERRED EMBODIMENT OF THE INVENTION

Figure 1:
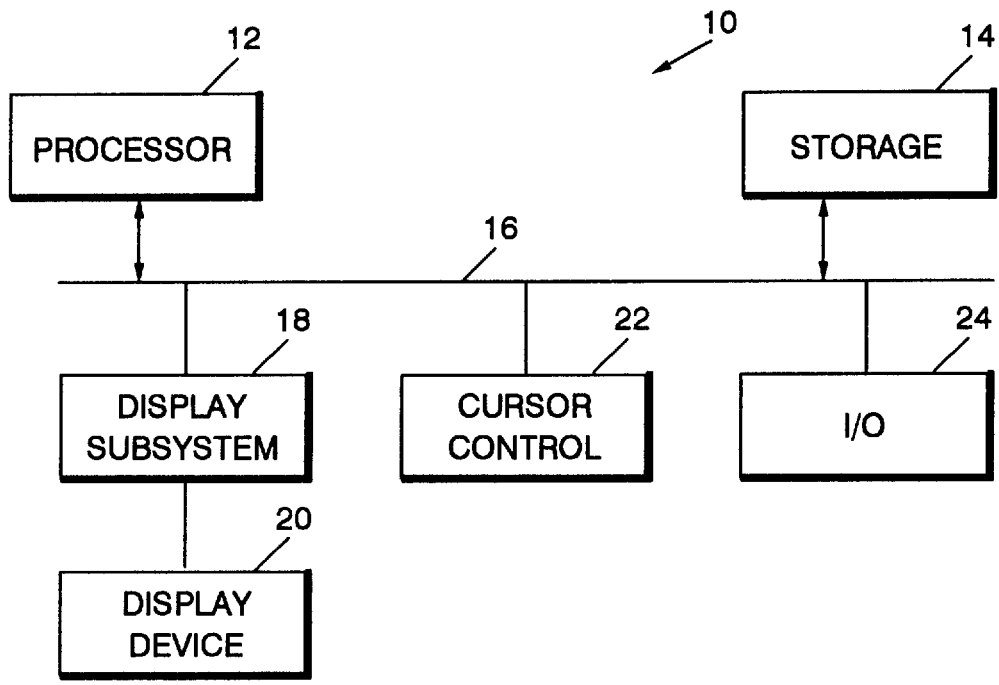
FIG. 1 is a block diagram of a system for executing the method according to the present invention.
Figure 2:
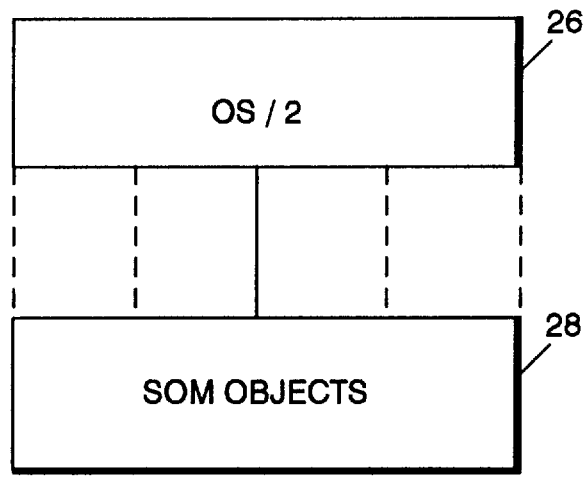
FIG. 2 is a block diagram showing the operating system platform and system object model program supporting the present invention.
Figure 3:
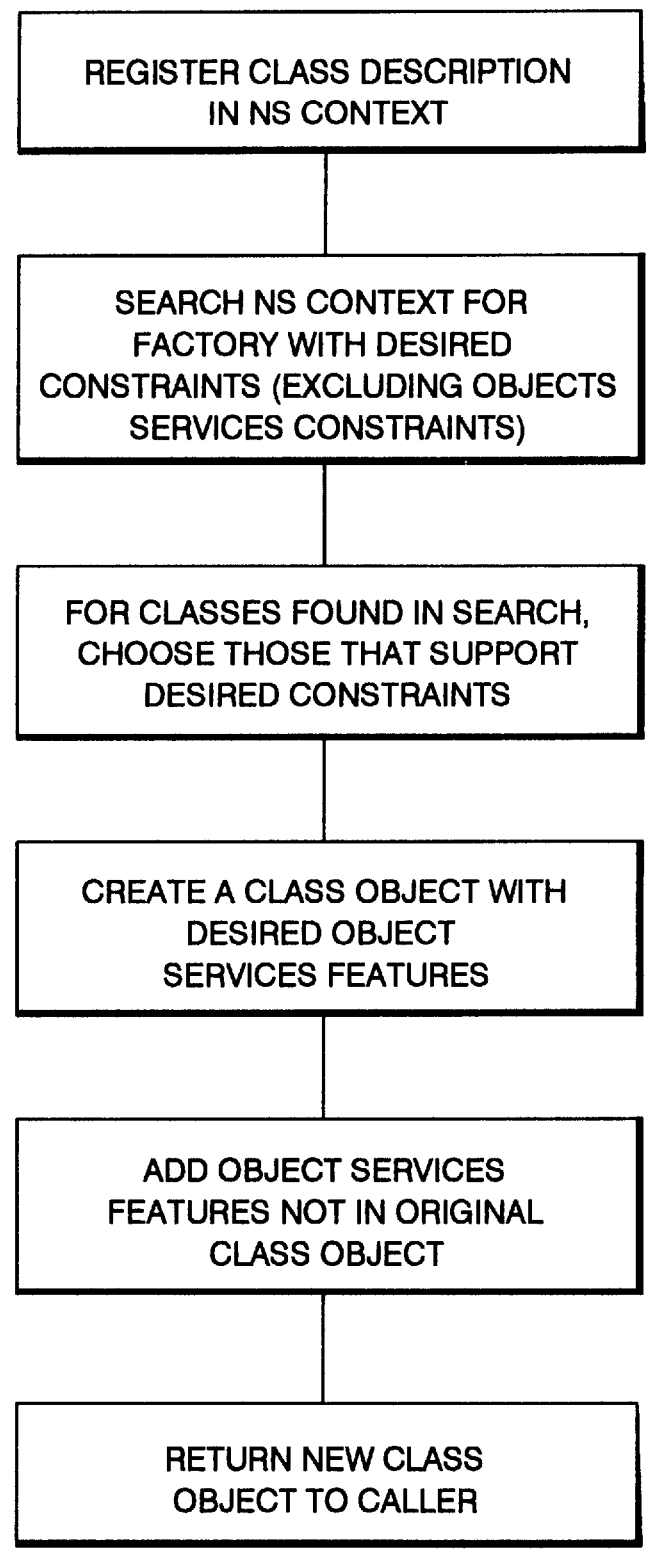
FIG. 3 is a flow chart of the method in accordance with the present invention.

Referring now to FIGS. 1 and 2, an information handling system 10 and an operating system environment for the present invention will be described.

Information handling system 10 may be a graphics work station or the like with a very powerful processor 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multitasking operating system such as OS/2* (OS/2 is a registered trademark of International Business Machines Corporation). Among many tasks which the OS/2 operating system controls for operating information handling system 10, is execution of a program SOMObjects, which is a commercially available product of International Business Machines Corporation.

The method and article of manufacture of the present invention may be incorporated in the SOMObjects program.

Concurrency service provides a lock manager which controls locks on behalf of either transactions or threads, where in dealing with transaction locks the concurrency handles locks inheritance for nested transactions and supports explicit locking and unlocking for applications where lock contention is a bottleneck.

The object consumer requests the object platform to add concurrency services to the binary class, producing a new class that fits more precisely into the object consumer's application. The enhancements to the binary class to facilitate concurrency services include the following:

Making the object concurrent, so that multiple users of the object can be serialised correctly. This involves getting a lock on the object using the Concurrency Service in a before method in accordance with the present invention.

In general, it is expected that the class provider, the entity which provides the abstracted data type referred to herein as a class, will construct the class without concern for object services. When a user wants an instance of a class, the combination of desired services are specified. A new binary class is constructed from the original which adds the desired object services. The description of the technique for inserting object services in a binary class is contained in the above referenced patent application Ser. No. 08/537,648 filed Oct. 8, 1995, which is incorporated by reference herein.

In accordance with the present invention, various forms of isolation between concurrent users of a binary class are provided by the Concurrent object service. The concurrent object service according to the present invention will be described.

The solution assumes SOM (single address space ORB), DSOM (across address space ORB), TSOM (transactional framework), and CSOM (concurrency framework).

The way the user specifies the different styles of concurrency is to specify the following constraint when searching for a class object:

name: concurrency_style value: this indicates the desired style of locking. One of the following possible values is chosen:

transactional (locks are implicitly obtained as needed on behalf of the current transaction and released at the end of the transaction (i.e., two-phase locking), per-method (locks are implicitly obtained on behalf of the current thread just prior to each method and released just after each method), explicit (the client is responsible for getting and releasing all locks), none (no locking support is provided).

For the first three styles, the ConcurrentObject interface is provided to clients and the lock granularity is the entire object. Thus, even for the styles of implicit locking, the client can get and release locks if desired. This allows other than two-phase locking with concurrency_style==transactional and allows locks to be held across multiple methods for concurrency_style==per-method.

For a class that does not support concurrency, we can automatically provide a version of that class that supports either automatic transactional locking (for recoverable==TRUE and in the scope of a transaction), automatic per method locking (for recoverable==FALSE or not in the scope of the transaction), or explicit locking. It is assumed that all non-recoverable objects require the same locking behavior, which is different from that required by recoverable objects. For the object concurrency service, only object-level locking is provided. If the user requires finer lock granularity this approach is not suitable.

Transactional Locking

Figure 4:
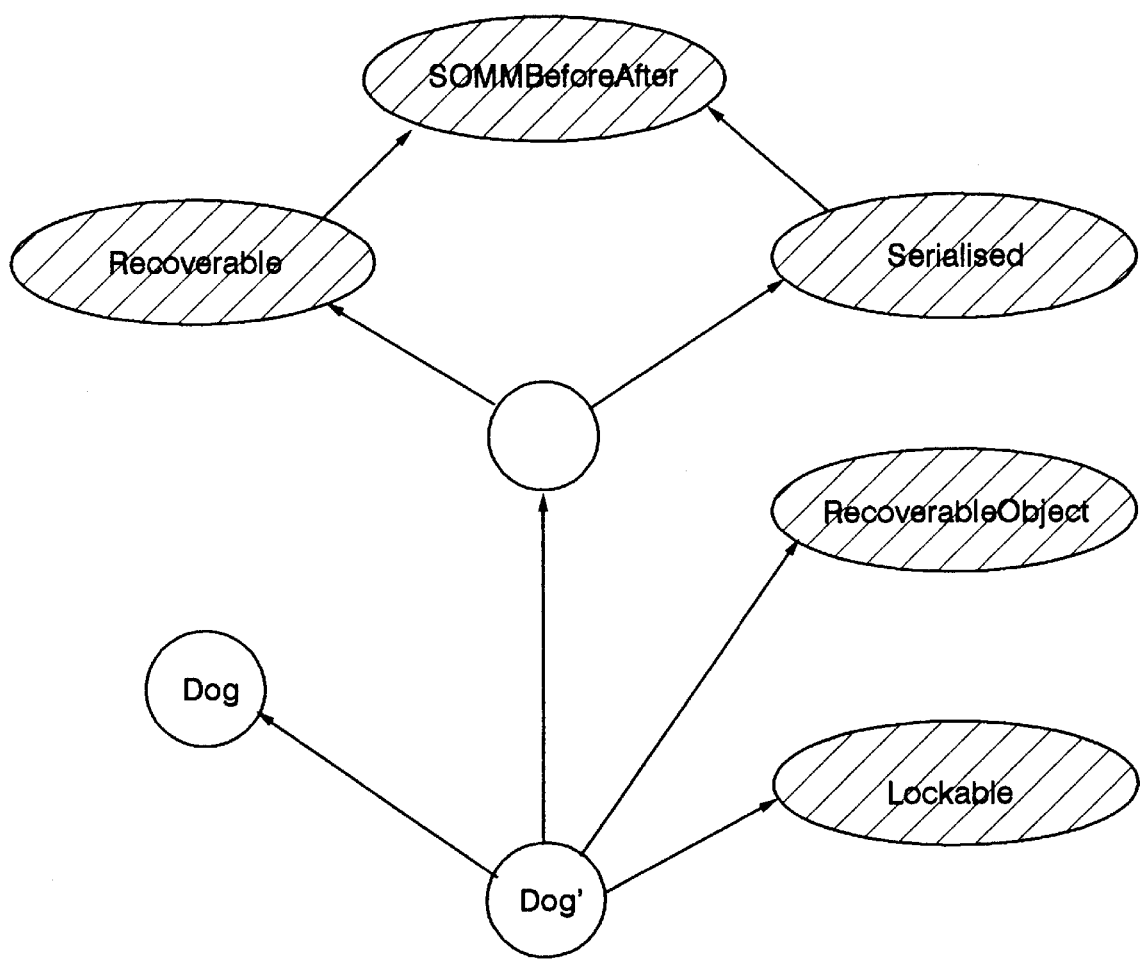
FIG. 4 is an object diagram of the method in accordance with a first embodiment of the present invention.

Transactional locking amounts to automatic locking for Recoverable Objects and is used with Recoverable==TRUE. The class diagram (see FIG. 4) for the automatic addition of the recoverable property (in whatever manner, so long as it derives its recoverability from the RecoverableObject class) would be changed by adding inheritance from a Lockable class, and the addition of the Serialised metaclass (composed with the Recoverable metaclass in any order).

The Lockable Class

The Lockable class adds state to a class to allow object-level locking. Each instance of the Lockable class has an associated LockSet object which represents the logical lock. The relationship between the lock and the object is thus 1 to 1. The Lockable class simply provides the initialization code, and the get operation to allow subclasses to obtain the LockSet object.

```
interface Lockable
{
    implementation
    {
        somInit override;

readonly attribute LockSet_lock_set;
```

```
};
};
```

The LockSet object is created when the Lockable object is instantiated. This LockSet is new and not related to any others (so when the transaction completes, it will need to be released independently of any other lock for the transaction).

```
void Lockable::somInit()
{
    _lock_set = _LocksetFactory->create();
};
```

The Serialised Metaclass

The Serialised metaclass adds before and after methods to all methods of Dog (the non-concurrent version) to get the methods of Dog' (the concurrent version).

The before method always obtains a lock on the object dependent on the read/write attribute of the operation, even when outside of a transaction (it is not mandated that RecoverableObjects may only execute their methods inside a transaction; the concurrency control specification allows invoking these operations regardless of transaction scope). The operations introduced by the RecoverableObject and Lockable superclasses never touch the object's state and so do not obtain the lock.

```
void Serialised::BeforeMethod()
{
    switch( method name )
    {
        case get_lock_set;
        case involve;
        case completed_subtran;
        case completed;
            // Do nothing for RecoverableObject or
            Lockable methods
            break;
        default;
            if( CONSTANT )
                _get_lock_set(somSelf)->lock(read);
            else
                _get_lock_set(somSelf)->look(write);
    }
}
```

The fact that the lock is obtained regardless of transaction scope allows use of this operation for non-RecoverableObjects; some updating of the after method is required to fully support this. RecoverableObjects that choose not to support certain operations outside of a transaction will simply hold a lock for the duration of the call that raises the TransactionRequired exception.

The after method releases locks in one of two ways, depending on whether the lock was obtained by a RecoverableObject in a transaction, in which case it should only be released when the transaction completes, or not (i.e., not RecoverableObject regardless of transaction scope, or RecoverableObject outside a transaction), in which case the lock should be released immediately.

```
void Serialised::AfterMethod()
{
    switch( method name )
    {
        case get_lock_set;
```

```
        case involve;
        case completed_subtran;
            // Do nothing for other RecoverableObject or
            Lockable methods
            break;
        case completed: // Recoverable and inside transaction
            _get_lock_set(somSelf)->get_coordinator()
            ->drop_locks();
            break;
        default;
            Control control = txn_crt->get_control();
            if( NotTransaction // not RecoverableObject )
                if( CONSTANT )
                    _get_lock_set (somSelf)->unlock(read);
                else
                    _get_lock_set(somSelf)->unlock(write);
    }   // If Recoverable and inside transaction wait for
        completed.
};
```

It should be noted that the reason to check for RecoverableObjects as well as outside a transaction, is that this will allow use of this metaclass with non-RecoverableObjects, in which case it will just provide serialization on a per-method basis, in exactly the same way as a RecoverableObject outside of a transaction. The before method, as mentioned earlier, does not require this check as it behaves in the same way regardless of transaction scope or recoverability.

Per Method Locking

Figure 5:
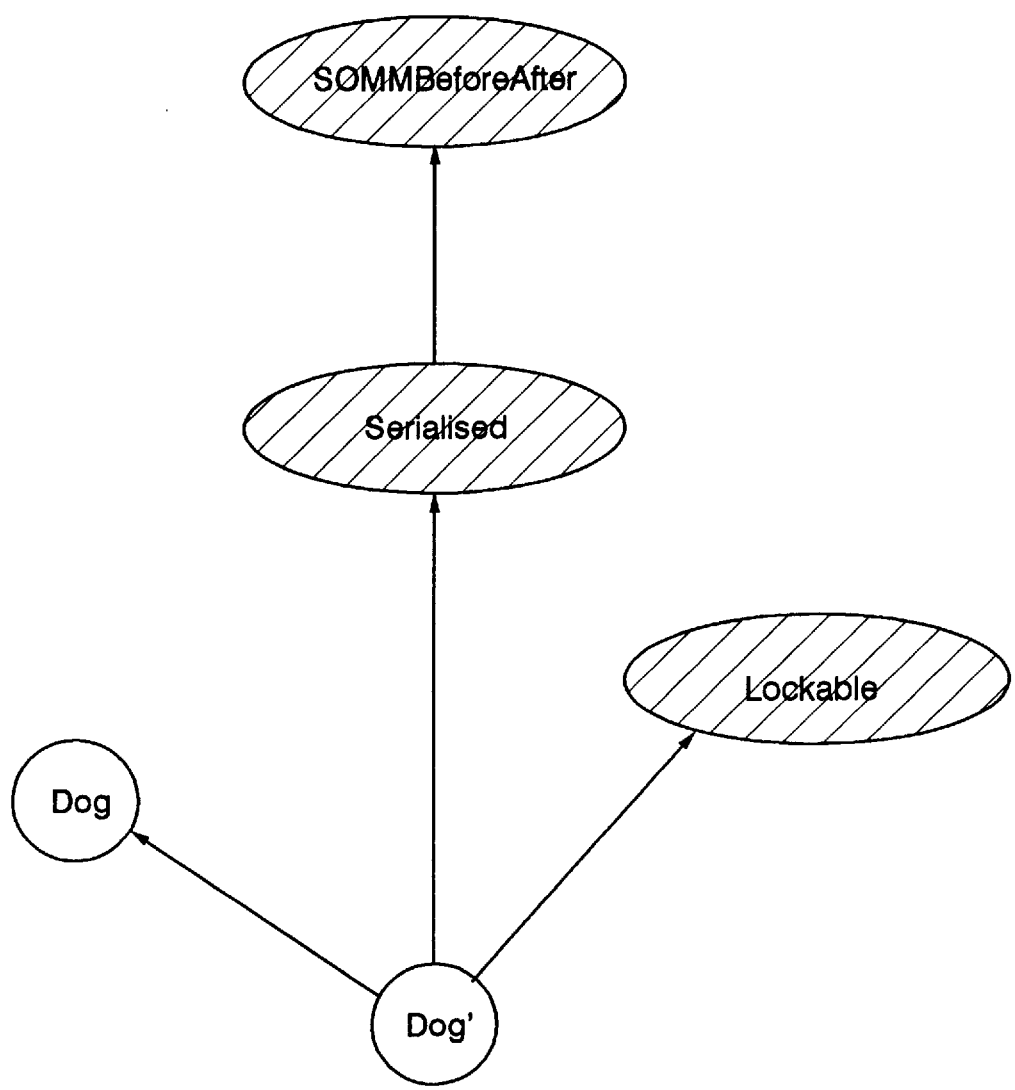
FIG. 5 is an object diagram of the method in accordance with a second embodiment of the present invention.

This is used with Recoverable==FALSE or when not in the scope of a transaction. The class is changed by using the Serialised metaclass and inheriting from the Lockable class (See FIG. 5). Due to the care taken above in the construction of the metaclass, no changes or new metaclass is necessary.

It can be seen that the concurrency control can be provided independent of the recoverability or persistence of the object, with the requirement that the Serialised metaclass check the transaction context and derivation of the target object from the RecoverableObject class. If this check is considered too expensive, then two versions of the metaclass may be produced with the check omitted. This has the advantage of increasing the number of metaclasses; it does not change the amount of interdependency between the two services; rather, it moves it to a more visible location.

Explicit Locking

For explicit locking of Recoverable Objects, the object inherits from a ConcurrentObject interface (which in turn is derived from Lockable) that provides operations to obtain and release locks (which pass through the LockSet operations on the LockSet introduced by the Lockable class).

For explicit locking of non-Recoverable Objects, behavior is exactly the same as for RecoverableObjects. The object inherits from a ConcurrentObject interface (which in turn is derived from Lockable) that provides operations to obtain and release locks (which pass through to the LockSet operations on the LockSet introduced by the Lockable class).

It will be appreciated that although a specific embodiment of the present invention has been described herein for the purposes of illustration, various modifications may be made without departing from the spirit or scope of the invention. Accordingly, the scope of this invention is limited only by the following claims and their equivalents.

What is claimed is:

1. A method for inserting concurrency object services into binary classes in an information handling system employing object oriented technology, comprising the steps of:

receiving a request to create a class object having concurrency control services from a binary class object;

recognizing a constraint indicating concurrency support provided by said binary class object; and determining a concurrency deficiency between said requested concurrency control services and said concurrency support provided;

generating a new object from said binary class object by adding concurrency control services to replace said concurrency deficiency.

2. A method according to claim 1, wherein the generating step further comprises the step of:

first inheriting from a lockable class which adds state to a class to allow object-level locking.

3. A method according to claim 2, wherein the generating step further comprises the step of:

second inheriting from a serialised metaclass which adds before and after methods to all methods of a non-concurrent version of an object.

4. A method according to claim 1, wherein the class object is a RecoverableObject.

5. A method according to claim 1, wherein the generating step further comprises the steps of:

deriving a concurrent object from a lockable class; and inheriting from the concurrent object.

6. A computer readable medium comprising means for inserting concurrent object services into binary classes in an information handling system employing object oriented technology, the inserting means comprising:

receiving a request to create a class object having concurrency control services from a binary class object;

means for recognizing a constraint indicating concurrency support provided bv the binary class object; and determining a concurrency deficiency between said requested concurrency control services and said concurrency support provided;

means for generating a new object from said binary class by adding concurrency control services to replace said concurrency deficiency.

7. A computer readable medium, according to claim 6, wherein said generating means further comprises:

means for inheriting from a lockable class which adds state to a class to allow object level locking.

8. A computer readable medium, according to claim 6, wherein the generating means further comprises:

means for inheriting from a serialised metaclass which adds before and after methods to all methods of a non-concurrent version of an object.

9. A computer readable medium, according to claim 6, wherein the class object is a RecoverableObject.

10. A computer readable medium, according to claim 6, wherein the generating means further comprises:

means for deriving a concurrent object from a lockable class; and means for inheriting from the concurrent object.

11. An information handling system, employing object oriented technology, for inserting concurrency object services into binary classes comprising:

one or more processors;

a memory system;

one or more I/O controllers, each controlling one or more I/O devices;

a bus connecting the processors, the memory system and the I/O controllers;

an operating system controlling operation of the processors, the memory system and the I/O controllers; and an object control means, the object control means comprising:

an currency object services inserting means, the inserting means comprising:

means for receiving a request to create a class object having concurrency control services from a binary class object;

means for recognizing a constraint indicating concurrency support provided by the binary class object; and means for determining a concurrency deficiency between said requested concurrency control services and said concurrency support provided;

means for generating a new object from said binary classes by adding concurrency control services to replace said concurrency deficiency.

12. An information handling system, according to claim 11, wherein the means for generating comprises:

means for inheriting from a lockable class which adds state to a class to allow object level locking.

13. An information handling system, according to claim 11, wherein the means for generating comprises:

means for inheriting from a serialised metaclass which adds before and after methods to all methods of a non-concurrent version of an object.

14. An information handling system, according to claim 11, wherein the binary class object is a RecoverableObject.

15. An information handling system, according to claim 11, wherein the means for generating comprises:

means for deriving a concurrent object from a lockable class; and means for inheriting from the concurrent object.

* * * * *